(12) United States Patent
Dwairy et al.

(10) Patent No.: US 11,525,332 B2
(45) Date of Patent: Dec. 13, 2022

(54) FRACTURING WING VALVES, ASSEMBLIES, AND METHODS

(71) Applicant: Bestway Oilfield, Inc., Channelview, TX (US)

(72) Inventors: Gassan Dwairy, Pasadena, TX (US); Ronny Gassan Dwairy, Pasadena, TX (US); Mark D. Albert, San Leon, TX (US)

(73) Assignee: BESTWAY OILFIELD, INC., Channelview, TX (US)

( * ) Notice: Subject to any disclaimer, the term of this patent is extended or adjusted under 35 U.S.C. 154(b) by 0 days.

(21) Appl. No.: 17/091,042

(22) Filed: Nov. 6, 2020

(65) Prior Publication Data
US 2021/0189832 A1    Jun. 24, 2021

Related U.S. Application Data

(60) Provisional application No. 62/950,917, filed on Dec. 19, 2019.

(51) Int. Cl.
| | | |
|---|---|---|
| *E21B 34/02* | (2006.01) | |
| *E21B 43/26* | (2006.01) | |
| *E21B 33/02* | (2006.01) | |
| *F16K 3/02* | (2006.01) | |
| *F16K 27/04* | (2006.01) | |
| *F15B 13/08* | (2006.01) | |

(52) U.S. Cl.
CPC .............. *E21B 34/02* (2013.01); *E21B 33/02* (2013.01); *E21B 43/2607* (2020.05); *F15B 13/0814* (2013.01); *F16K 3/0254* (2013.01); *F16K 27/044* (2013.01)

(58) Field of Classification Search
CPC ............................ E21B 34/02; E21B 43/2607
See application file for complete search history.

(56) References Cited

U.S. PATENT DOCUMENTS

| | | | | |
|---|---|---|---|---|
| 7,306,201 | B2 * | 12/2007 | Lam ...................... | F16K 3/0227 |
| | | | | 251/327 |
| 2010/0012328 | A1 * | 1/2010 | Nikirofuk ............... | E21B 19/16 |
| | | | | 166/98 |
| 2017/0191570 | A1 * | 7/2017 | Roberts .................... | F16K 3/26 |
| 2019/0010781 | A1 * | 1/2019 | Tran ........................ | E21B 43/26 |

* cited by examiner

*Primary Examiner* — Robert E Fuller
(74) *Attorney, Agent, or Firm* — Johnston IP Law, PLLC

(57) ABSTRACT

A hydraulic fracturing tree wing is formed with a studded hydraulic valve next to a manual valve. The stud-to-flange connection allows for a shorter, lighter wing. The studded hydraulic valve may be a gate valve that includes a T-slot coupling between an operating stem and the gate. A bonnet seal ridge may be formed to withstand undue deformation during operation that wears or destroys seals. A method for forming a hydraulic fracturing tree assembly includes using a flanged manual valve with a studded hydraulic valve. Other valves and methods are presented.

15 Claims, 7 Drawing Sheets

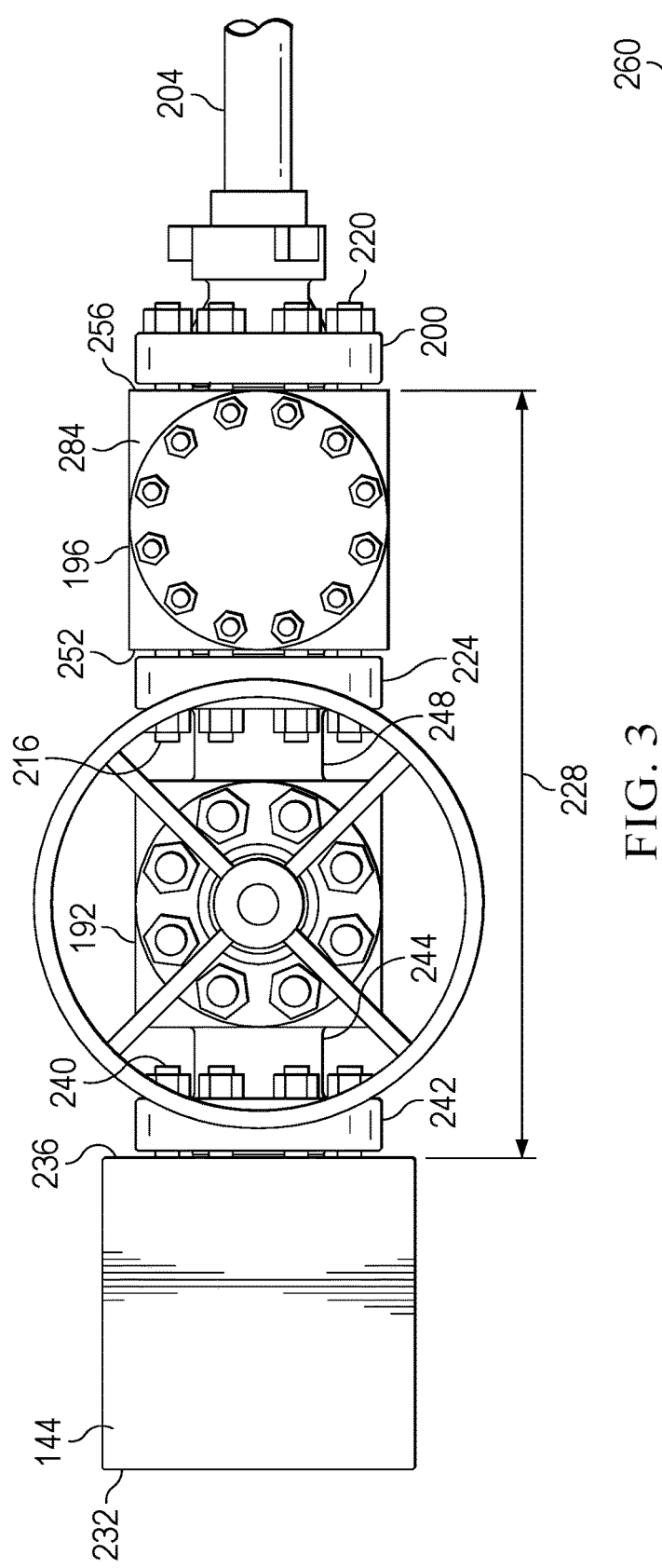
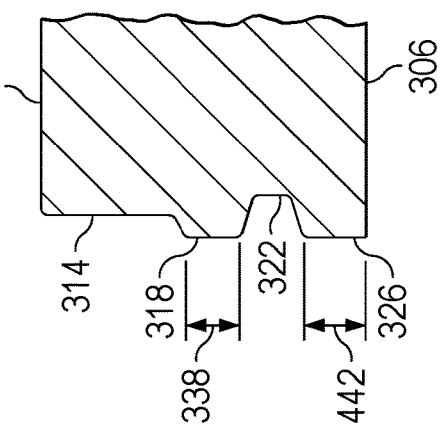
FIG. 3
FIG. 6

FRACTURING WING VALVES, ASSEMBLIES, AND METHODS

CROSS-REFERENCE TO RELATED APPLICATION

This application claims the benefit of U.S. Provisional Application Ser. No. 62/950,917, filed by Gassan Dwairy, et al., on Dec. 19, 2019, entitled "Fracturing Wing Valves, Assemblies, and Methods," which is incorporated herein by reference in its entirety for all purposes.

TECHNICAL FIELD

This application is directed, in general, to oil and gas production, and more specifically, to hydraulic fracturing wing valves, wing valve assemblies, and methods.

BACKGROUND

Oil and gas provide much of the energy used for transportation in the world today. As oil and gas resources become rarer, newer techniques are being used to further develop these resources. Hydraulic fracturing is a technique that assists in reaching what has previously been difficult-to-reach sources of oil and gas. While in existence from the 1940s, hydraulic fracturing (or "fracking" or "fracing") has only become common place in the United States and other locations in more recent times.

At a high level, hydraulic fracturing enhances production from a well by creating man-made fractures in rock formations to facilitate oil and gas removal. The fracturing process typically involves injecting a fracturing fluid, e.g., sand, water, and certain chemicals, into the well under pressure to form the man-made fractures. The man-made fractures or larger fissures allow more oil and gas to flow out of formations and into the wellbore. The oil and gas can be readily extracted from the wellbore.

In delivering and removing the fracturing fluids from the wellhead, a fracturing tree, which is a grouping of valves and equipment, is typically used. While fracturing equipment has advanced in recent times, further improvements are still desirable.

SUMMARY

According to an illustrative embodiment, a hydraulic fracturing tree assembly includes a flow cross member and a first wing extending from the flow cross member. The first wing includes a manual valve fluid having a first flange on a first side coupled to the flow cross member and a second flange on a second side. The manual valve has a bore for flow therethrough in a first direction. The first wing further includes a studded hydraulic valve having a first plurality of studs extending from a first side and parallel to the first direction, which is in a direction of flow through the studded hydraulic valve. The studded hydraulic valve has a flow bore therethrough. The studded hydraulic valve is coupled to the manual valve with the first plurality of studs of the studded hydraulic valve extending through the second flange of the manual valve. The studded hydraulic valve is a gate valve.

The studded hydraulic valve includes a valve body formed to resemble a cuboid having a first side and an opposing second side, a third side and an opposing fourth side, and a fifth side and an opposing sixth side. The valve body has the flow bore extending from the first side to the second side and a valve gate bore extending from the third side to the fourth side. The studded hydraulic valve also includes a gate disposed within the valve gate bore, the gate having a first end and a second end, and a piston unit coupled to the valve body on the third side and having a piston coupled to an operating stem for selectively moving the operating stem. The operating stem extends into the valve gate bore at times and has a first end and a second end. The first end of the operating stem is coupled to the piston, and the second end of the operating stem has T-member formed thereon. The gate has a T-slot formed on the first end that is sized and configured to mate with the T-member on the second end of the operating stem. The T-slot is parallel with the first direction.

According to another illustrative embodiment, a hydraulic fracturing wing valve includes a valve body formed to resemble a cuboid and having a first side and an opposing second side, a third side and an opposing fourth side, a fifth side and an opposing sixth side. The valve body is formed with a flow bore extending through the valve body in a first direction from the first side to the second side. The valve body is formed with a gate valve bore extending from the third side to the fourth side. The hydraulic fracturing wing valve further includes a first plurality of studs extending from the first side of the valve body and a second plurality of studs extending from the second side of the valve body.

The hydraulic fracturing wing valve further includes a gate having a first end and a second end; a T-slot formed on the first end of the gate; and an operating stem having a first end and a second end, wherein the second end of the operating stem is formed with a T-member. The hydraulic fracturing wing valve includes a piston unit coupled to the third side of the valve body, wherein the piston unit has a piston that couples to the first end of the operating stem. The first end of the gate is formed with a T-slot sized and configured to slideably couple to the T-member of the operating stem, and wherein the T-slot is parallel to the first direction. The hydraulic fracturing wing valve also includes a plurality of bonnet studs extending from the fourth side of the valve body.

According to still another illustrative embodiment, a method of manufacturing a hydraulic fracturing wing valve includes forming a valve body to resemble a cuboid having a first side and an opposing second side, a third side and an opposing fourth side, a fifth side and an opposing sixth side; forming a flow bore through the valve body in a first direction from the first side to the second side; and forming a gate valve bore through the valve body from the third side to the fourth side. The method also includes drilling and taping a first plurality of stud bores on the first side of the valve body; applying a first plurality of studs into the first plurality of stud bores such that the first plurality of studs extends from the first side of the valve body; drilling and taping a second plurality of stud bores on the second side of the valve body; and applying a second plurality of studs into the second plurality of stud bores such that the second plurality of studs extend from the second side of the valve body.

The method further includes providing a gate having a first end and a second end with a T-slot formed on the first end of the gate; providing an operating stem having a first end and a second end, wherein the second end of the operating stem is formed with a T-member; coupling a piston unit to the third side of the valve body, wherein the piston unit has a piston; coupling the piston to the first end of the operating stem; and coupling the operating stem to the gate by disposing the T-member into the T-slot for a slideable engagement that allows movement in the first direction.

According to yet another illustrative embodiment, a method of regulating flow in a wing of a hydraulic fracturing tree includes coupling a manual valve proximate a flow cross member of a fracturing tree. The manual valve includes a first flange on a first side and a second flange on a second side, the first flange coupled to the flow cross member. The method also includes coupling a studded hydraulic valve to the second flange of the manual valve. A first plurality of studs extends from a first side of the studded hydraulic valve and extends through the second flange of the manual valve. The studded hydraulic valve is a gate valve and has a T-slot coupling between an operating stem and a first end of the gate. Other valves, assemblies, and methods are presented herein.

DESCRIPTION OF THE DRAWINGS

Illustrative embodiments of the present invention are described in detail below with reference to the attached drawing figures, which are incorporated by reference herein and wherein:

FIG. 3 is a schematic elevation view of a portion of a hydraulic fracturing tree;

FIG. 6 is a schematic cross section of an upper portion of the valve body of FIG. 4 at the start of a gate valve bore;

DETAILED DESCRIPTION

In the following detailed description of the preferred embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized, and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the claims.

Unless otherwise indicated, as used throughout this document, "or" does not require mutual exclusivity.

Figure 1:
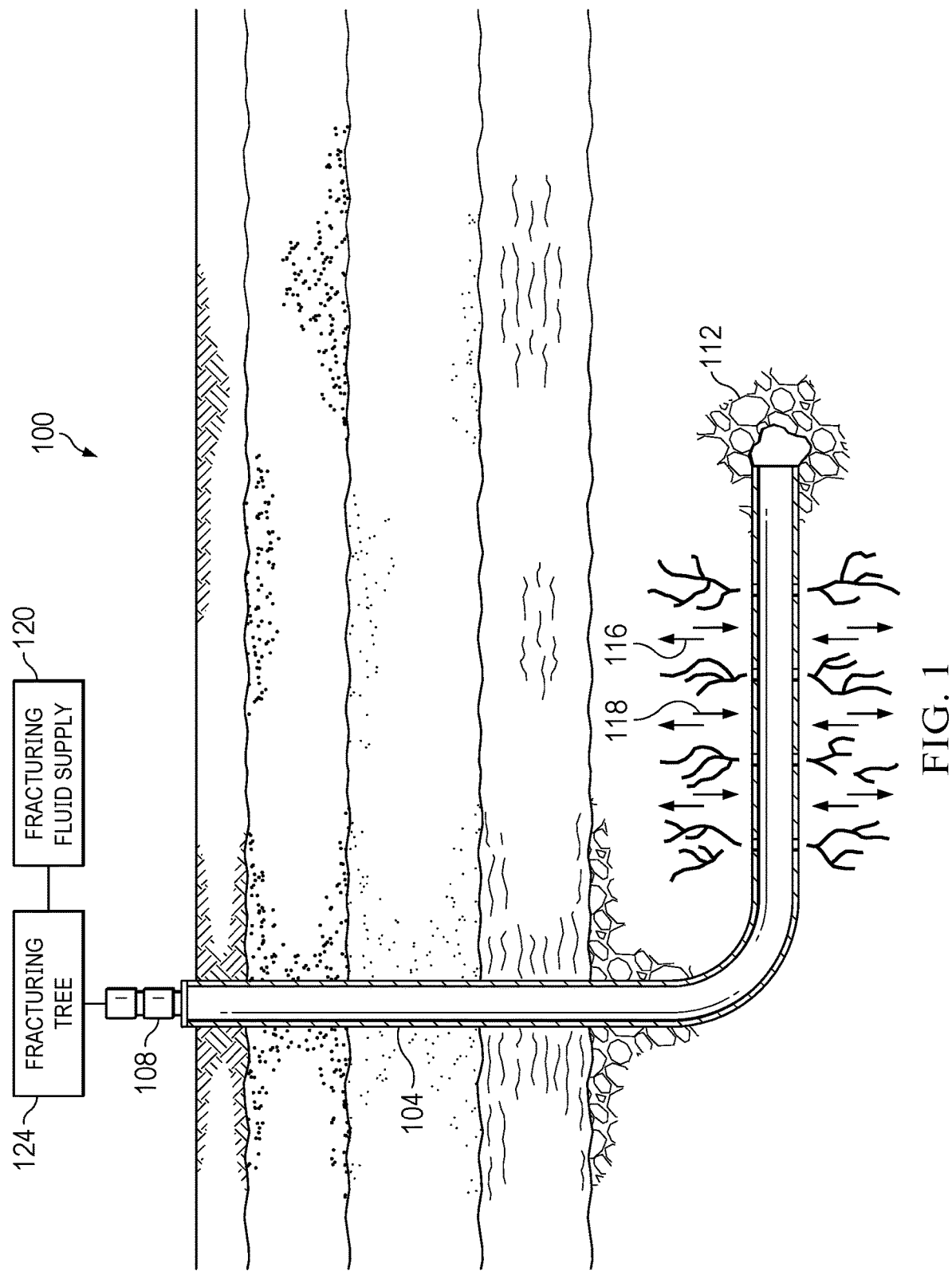
FIG. 1 is a schematic diagram that illustrates a hydraulic fracturing system at a well site shown with the above-ground portion shown in block diagrams and the subterranean portion shown in cross section.

Referring now to the figures, and initially to FIG. 1, a diagram of a hydraulic fracturing system 100 is presented with a subterranean portion shown in cross section and the above ground portions shown as a schematic block diagram. The well 104 extends from the wellhead 108 and into a subterranean strata or formation 112 from which natural resources, e.g., oil and gas, are removed. The removal of natural resources is enabled or enhanced by the hydraulic fracturing system 100.

The hydraulic fracturing system 100 injects fracturing fluid into the well 104 and into the formation 112. The flow of the fracturing fluid 116 into the formation 112 increases the number or size of fractures in a rock formation of the formation 112 to enhance flow 118 of resources into the well 104. To do this, a fracturing fluid supply 120 is delivered through a fracturing tree 124 to the well 104. In the disclosure herein, the fracturing tree 124 has a fracturing wing valve in the form a studded hydraulic valve (see, e.g., 196 in FIG. 3) that may provide improved performance over existing valves or other advantages.

In delivering and removing the fracturing fluids from the wellhead, the fracturing tree 124 is used. The fracturing tree 124, or frac tree, is a Christmas tree installed for the fracturing process. Typically, a frac tree 124 includes upper and lower master valves, flow cross member, wing valves, goat head, and swab valve. Space, weight, and assembly of such frac trees can involve issues. One aspect of the disclosure addresses wing valves on the frac tree as will be described.

Figure 2:
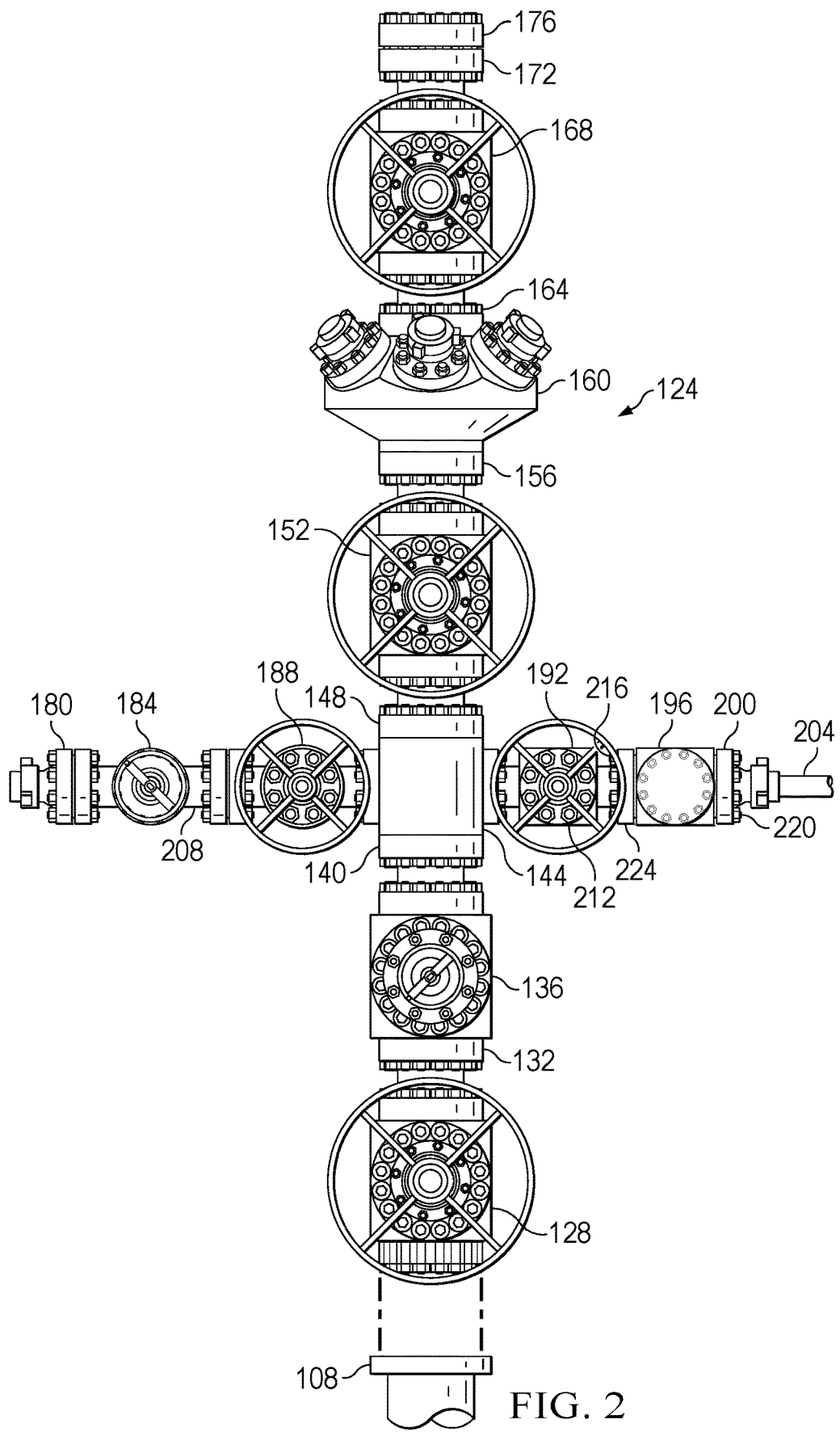
FIG. 2 is a schematic elevation view of a hydraulic fracturing tree having two hydraulic fracturing wings.

Referring now primarily to FIG. 2, a schematic elevation view of an illustrative fracturing tree 124 is presented. The illustrative fracturing tree 124, beginning in the vertical at the bottom for the orientation shown proximate the wellhead 108, includes a first manual BSO valve 128, a first spool 132, a first hydraulic valve 136, a second spool 140, a flow cross member 144, a third spool 148, a second manual BSO valve 152, a fourth spool 156, a goat head 160, a fifth spool 164, a third manual BSO valve 168, a sixth spool 172, and a blind flange 176. As used herein, "manual" means hand operated.

In the horizontal starting on the left for the orientation shown, the fracturing tree 124 includes a first WECO flange 180, a second hydraulic valve 184, a fourth manual BSO valve 188, the flow cross member 144 again, a fifth manual BSO valve 192, a third hydraulic valve 196, which is a studded hydraulic valve 196, and a second WECO flange 200, which couples to a threaded pipe or conduit 204. The first WECO flange 180, the second hydraulic valve 184, the fourth manual BSO valve 188 are on a first wing 208. The fifth manual BSO valve 192, the third hydraulic valve 196, and the second WECO flange 200 are on a second wing 212.

Much of the focus herein will be on the illustrative third hydraulic valve 196. While only one valve of the type of the third hydraulic valve 196 is shown, other hydraulic valves herein could be of the same type as will be explained further herein.

Referring now primarily to FIG. 3, the illustrative third hydraulic valve 196 is shown with only a portion of the fracturing tree 124. The third hydraulic valve 196 includes a studded valve as opposed to a flanged valve. In this view, one may see a first plurality of studs 216 extending to the left for the orientation shown and a second plurality of studs 220 extending to the right for the orientation shown. The first plurality of studs 216 interfaces with and is coupled to a flange 224 of the fifth manual BSO valve 192; because it is a stud-to-flange connection, the connection is shorter than a flange-to-flange connection.

For example, in one illustrative embodiment, a wing dimension 228 will be described that reflects the benefits of the studded valve design. The wing dimension 228 extends from a face of the cross 144 to the second WECO flange 200 for the second wing 212. In one embodiment, the wing dimension 228 includes the fifth manual BSO valve 192 sized with 4 1/16 inch bore and configured for 15,000 PSI and the third hydraulic valve 196, which is studded, and is also sized for a 4 1/16 inch bore and configured for 15,000 PSI (i.e., a "4-15" valve), and in this illustrative embodiment, the wing dimension was 44.5 inches; Compared to a the same fifth manual BSO valve 192 and a flanged 4 1/16-15 hydraulic valve that together form a wing dimension 228 of 58 inches, it is a significant shortening in length. Thus, using the studded third hydraulic valve 196 as described allowed for a reduction in the wing dimension 228 by 13.5 inches, which is a about a 23% reduction in length. That shortening may provide certain advantages including possibly making the valve lighter, safer, easier to connect, and cheaper to make. It reduces the weight because the studs are lighter than a flange arrangement, and the bending moment on the wing is less because there is less weight and less arm.

While an illustrative embodiment has been described for a 4-15 studded hydraulic valve 196, it should be understood that other sizes may be used. For example, the studded hydraulic valve 196 may be made for other sizes, such as, 4-5, 4-10, 4-15, 3-15, 3-10, or others.

Continuing to refer to FIG. 3, the flow cross member 144 has a first side 232 and a second side 236. The second side 236 may have a plurality of studs 240 extending therefrom that extend through a flange 242 on a first side 244 of the manual valve 192. The manual valve 192 has the flange 224 on a second side 248. The studded hydraulic valve 196 includes the first plurality of studs 216 extending from a first side 252, which is opposite a second side 256. The studded hydraulic valve 196 is coupled to the manual valve 192 with the first plurality of studs 216 of the studded hydraulic valve 196 extending through the second flange 224 of the manual valve 192.

Figure 4:
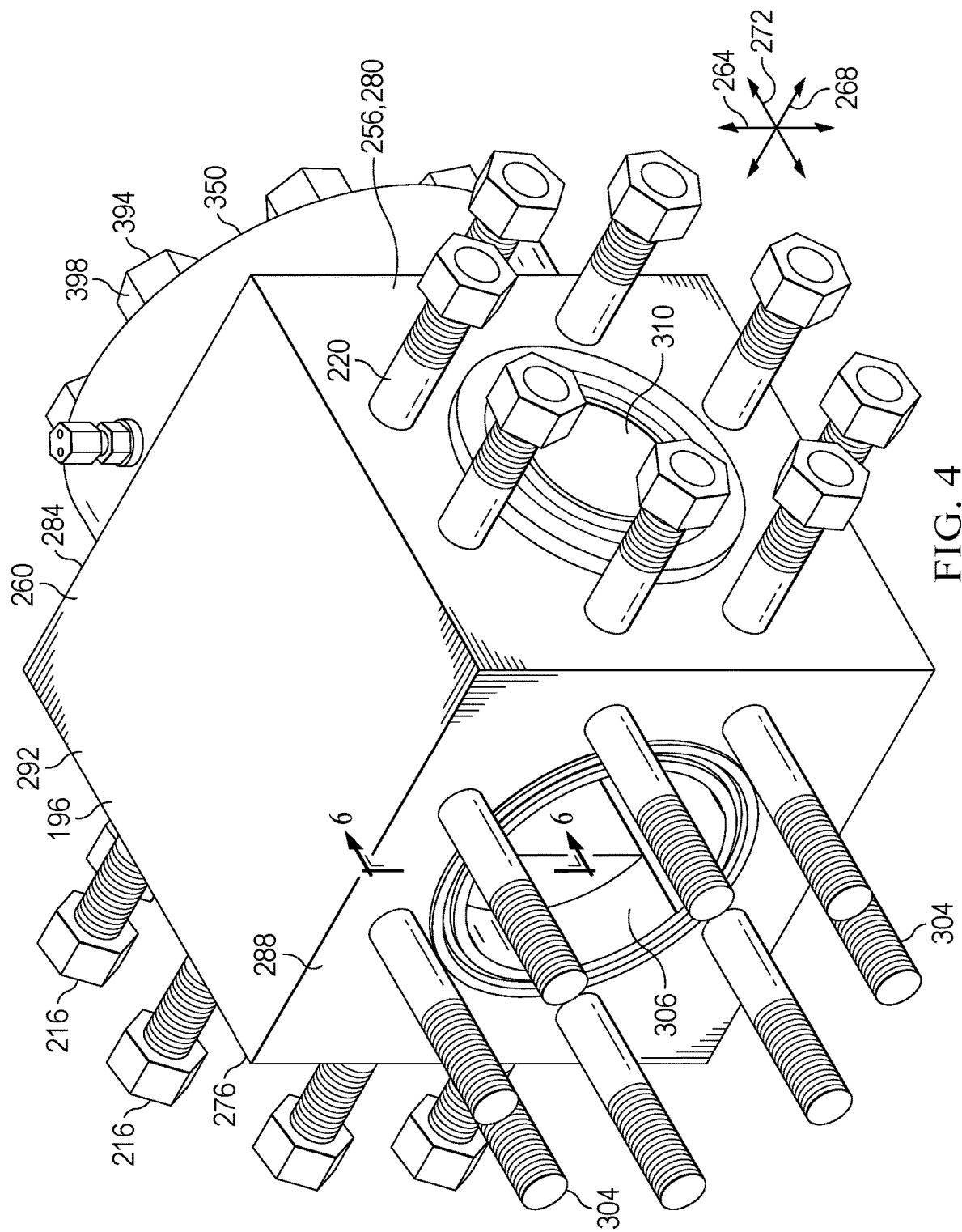
FIG. 4 is a schematic, perspective view of a portion of a hydraulic fracturing wing valve featuring a valve body.

Referring now primarily to FIG. 4, a portion of the studded hydraulic valve 196 is presented. The studded hydraulic valve 196 in one illustrative embodiment a gate valve. The studded hydraulic valve 196 includes a valve body 260. The studded hydraulic valve 196 is presented with reference to a first direction 264 (vertical as shown), a second direction 268, and a third direction 272. The gate valve (see, e.g., 358 in FIGS. 7-9) moves substantially parallel to the third direction 272 and the flow through the valve 196 is in the second direction 268.

The valve body 260 may be formed resembling a block (or more generally a cuboid) and has first side 276 (252 in FIG. 3) and an opposing second side 280 (same as second side 256 of the valve 196 in FIG. 3). The valve body 260 also has a third side 284 and an opposing fourth side 288. The valve body 260 also has a fifth side 292 and an opposing sixth side on the bottom for the orientation shown. The first plurality of studs 216 extends from the first side 276 and the second plurality of studs 220 extends from the second side 280. A first plurality of bonnet studs 394 extend from the third side 284. A plurality of bonnet studs 304 extends from the fourth side 288. A valve gate bore 306 is shown extending through the valve body 260 parallel to third direction 272, and flow bore 310 extends through the valve body 260 parallel to second direction 268.

Figure 5:
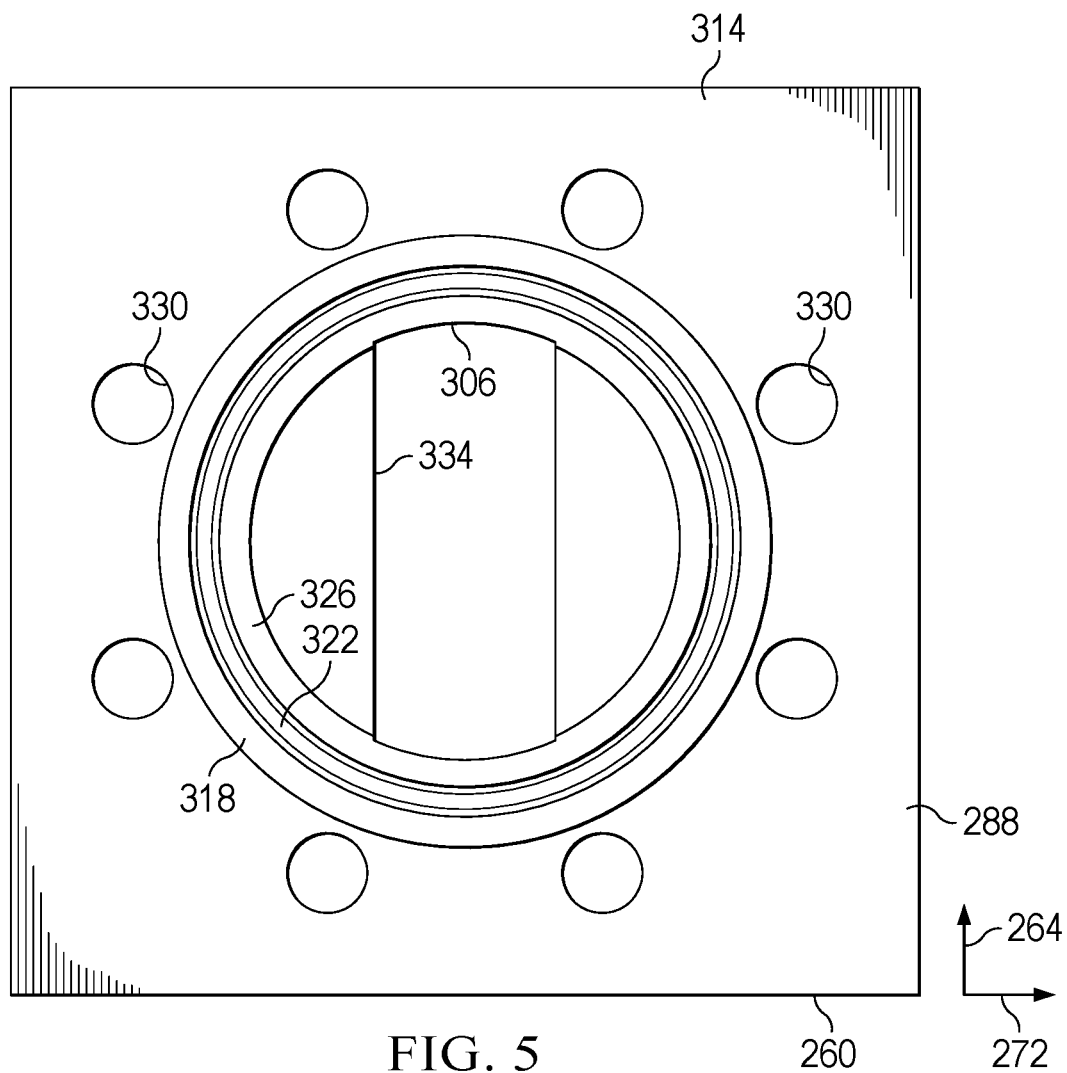
FIG. 5 is a schematic elevation view of the portion of the hydraulic fracturing wing valve of FIG. 4 for the side on which a lower bonnet is to be attached.

Referring now primarily to FIGS. 5 and 6, the fourth side 288 of the valve body 260 is presented. FIG. 5 is an elevation plan view of fourth side 288 of the valve body 260. FIG. 6 is a cross section of a portion taken at an upper edge of the valve body 260 at the center of the valve gate bore 306. The valve body 260 has a face portion 314 from which a raised portion 318 extends (see FIG. 6). In some embodiments, the raised portion 318 is concentric with the valve gate bore 306. Moving inward from the raised portion 318 is a trough 322, or groove, that extends into valve body 260 and is also concentric with the valve gate bore 306. The trough 322 may have walls that angle inward as the trough goes deeper into the block; for example, the angle may be 23 degrees from vertical or may be between 20 and 25 degrees or other angles. Moving further inward, a bonnet seal ridge 326 is formed. The bonnet seal ridge 326 is also concentric with the valve gate bore 306.

A bonnet seal gasket or ring (not shown in FIG. 5, but see 385 in FIG. 7) goes into trough 322 with the bonnet seal ridge 326 on one side and the raised portion 318 on the other. In one illustrative embodiment, for a 4-15 hydraulic valve, the radial width 338 of the raised portion 318 is approximately 0.51 inches. The raised portion 318 allows time savings when the valve 196 is being reworked because only the raised portion 318 must be worked rather than the entire face 314. "Raised" means the portions extends from the surface or face 314 as shown best in FIG. 6. The radial width 442 of the bonnet seal ridge 326, which is adjacent the trough, for the same illustrative embodiment of a 4-15 hydraulic valve is approximately 0.516 inches. In any event, radial width 442 of the bonnet seal ridge 326 is sized to be thick enough to avoid pressure deformation that impinges on the bonnet seal gasket that is positioned in trough 322. Those skilled in the art will appreciate that the dimension may be changed and will vary some with different sized valves.

A plurality of bonnet-stud bores 330 are shown that are tapped to receive the bonnet studs 304 (see, e.g., 304 in FIG. 4). FIG. 5 shows that the valve gate bore 306 has a constricted portion 334 that approximates more closely the gate (see, e.g., 358 in FIGS. 7-9).

Referring again to FIG. 3 and also to FIG. 4, the first plurality of studs 216 extend through the flange 224 and in the installed position the flange 224 is adjacent to the first side 276 of the valve body 260. The second plurality of studs 220 extends through the flange 200, and in the installed position, the flange 200 is adjacent the second side 280 (FIG. 4). As will be clear from FIG. 7, the lower bonnet couples to the plurality of bonnet studs 304.

Figure 7:
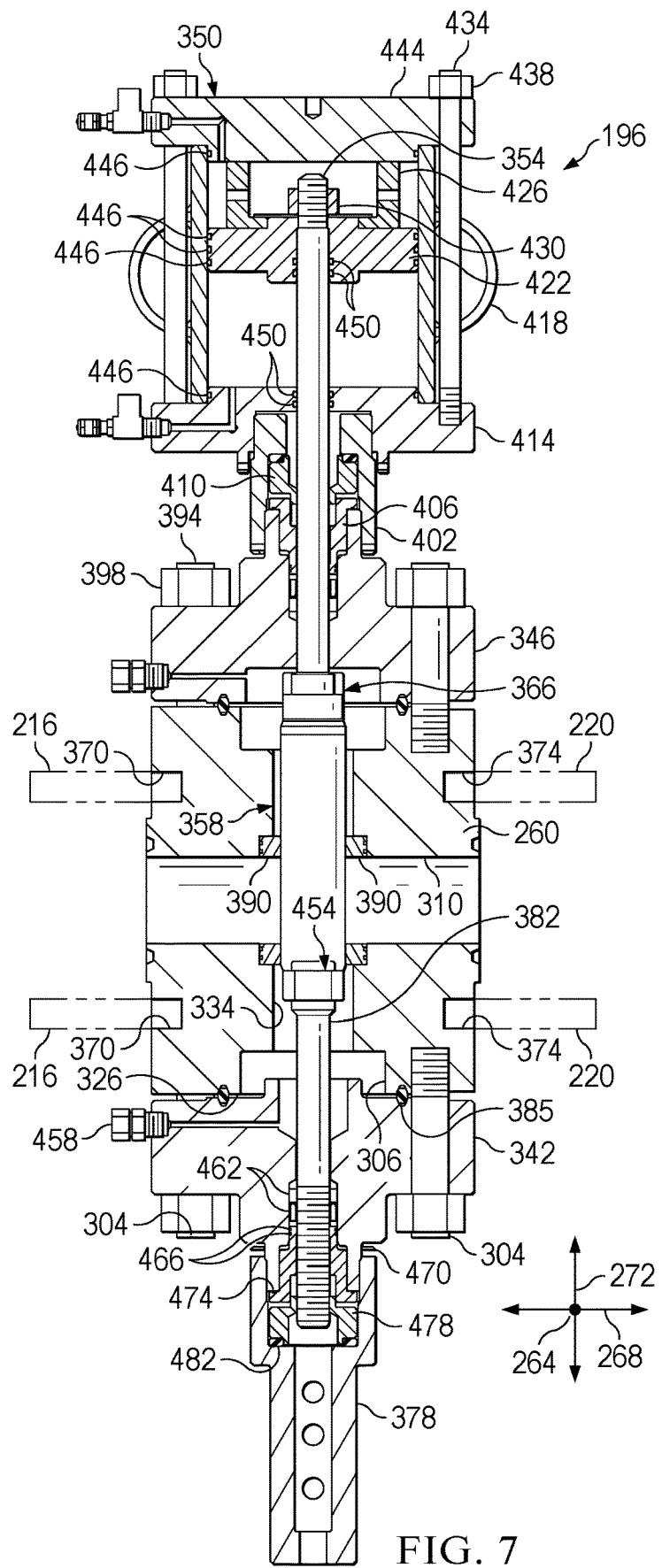
FIG. 7 is a schematic cross section a hydraulic fracturing wing valve with the cut plane parallel to the flow direction.

Referring now primarily to FIG. 7, a cross section of the studded hydraulic valve 196 is presented. The valve body 260 is shown at a center portion with a lower bonnet 342 attached on a lower potion (against side 288, FIG. 4) and an upper bonnet 346 attached on an upper portion (against side 284, FIG. 4). A piston unit 350 is coupled to the upper bonnet 346 and serves to selectively, under the influence of hydraulic pressure, move an operating stem 354 to move a gate 358 within the bore 306 with the gate 358 moving in the constricted portion 334 to control flow through the flow bore 310 (FIG. 4). As described further below in connection in with FIGS. 8 and 9, the operating stem 354 has a proximal end (lower end in FIG. 7) with T-slot coupling 366 to the gate 358 that allows movement in the first direction 264; this in turn reduces stress and strain on the operating stem 354 that can lead to failure or other issues. As previously mentioned, the bonnet seal ridge 326 is sized to reduce or eliminate deformation under rated pressures. The first plurality of studs 216 is shown in broken lines extended from first stud bores 370 that have been drilled and tapped. Likewise, the second plurality of studs 220 are shown in broken lines extending from second stud bores 374.

The valve 196 may include many other components as one skilled in the art would know from the figure. A balance stem protector 378 is shown at a bottom portion for providing space for a balance stem 382 to extend when the gate 358 is moved downward for the orientation shown. A bonnet seal, or gasket 385, is disposed in the trough 322 (FIG. 5) next to the bonnet seal ridge 326. Seats 390 are proximate the gate 358 and proximate flow bore 310. The upper bonnet 346 is coupled by bonnet studs 394 and bonnet nuts 398. A short barrel 402 is above (for orientation shown) upper bonnet 346 and is near a gland nut 406 and v-packing driver 410.

The lower cylinder head 414 is coupled to the short barrel 402. The cylinder 418 is shown with piston 422. Associated with the piston 422 is a piston stop plate 426 and piston lock nut 430. The cylinder stud 434 and cylinder nut 438 are shown toward an exterior and holding upper cylinder head 444. Associated with the piston 422 and cylinder 418 are a plurality of piston O-rings 446 and stem O-rings 450.

Moving back to the valve body 260, a set screw 454 is shown proximate the balance stem 382. A bonnet autoclave fitting 458 is shown to one side gaining access to the valve gate bore 306. A plurality of stem stack packs 462 are shown and also radial gland nut O-rings 466. The lower bonnet 342 has a lock screw 470. Below (for orientation shown) the lock screw 470, are an axial gland nut O-ring 474, a v-packing set 478, and a bearing set 482.

Figure 8:
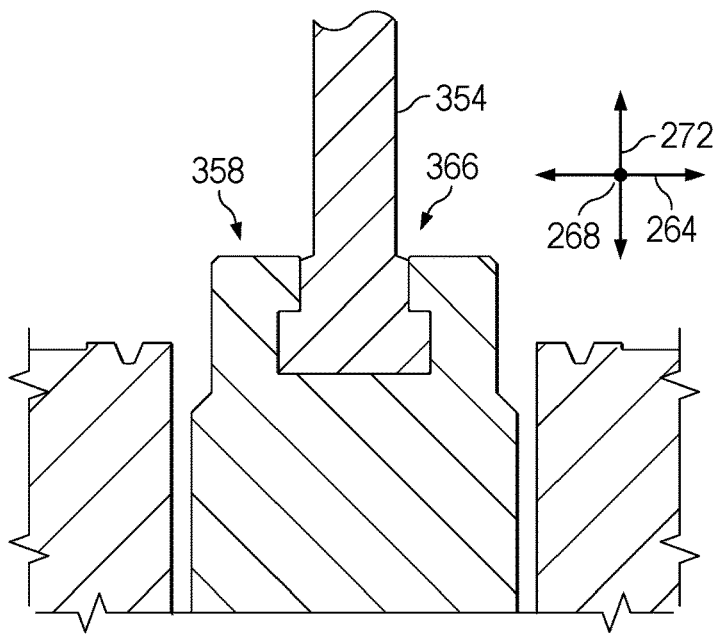
FIG. 8 is a schematic cross section of a T-slot coupling between an operating stem and an end of a gate of the gate valve of FIG. 7.
Figure 9:
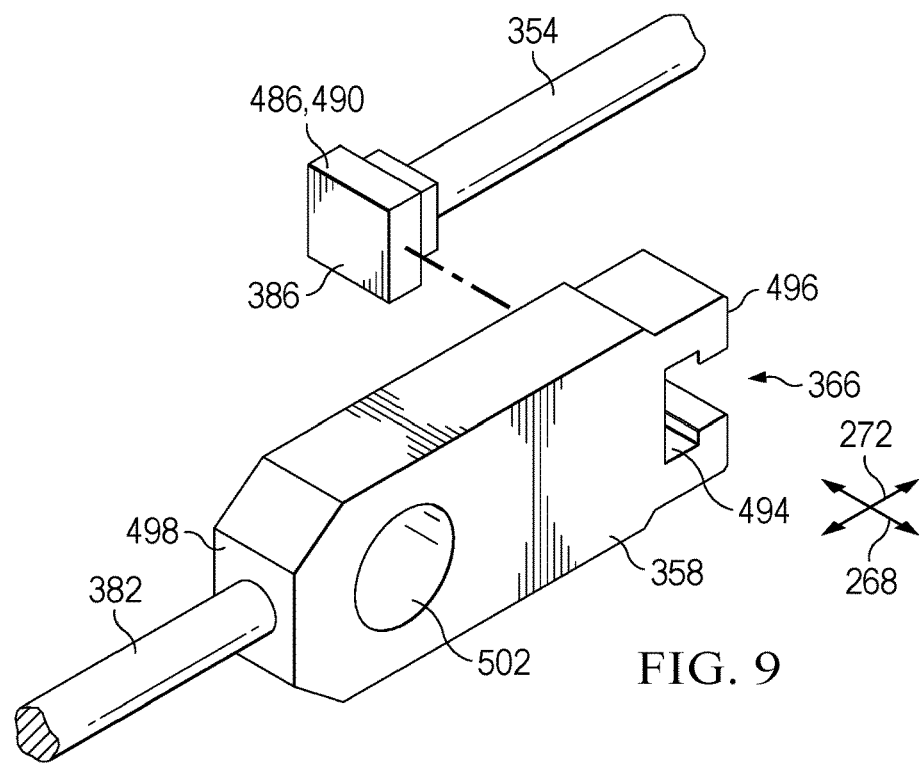
FIG. 9 is a schematic, perspective view of a gate and a portion of an operating stem and balance stem, wherein the operating stem is slightly displaced for illustration purposes.

Referring now to FIGS. 8 and 9, and initially to FIG. 8, the T-slot coupling 366 is further explained. FIG. 8 shows a cross section of the T-slot coupling 366 showing the gate 358 and the operating stem 354. The flow direction with respect to FIG. 8 is in and out of the page, i.e., in direction 268. As the gate 358 experiences high pressure, the gate 358 may move in the direction of 268 and because of the T-slot coupling 366, movement between the gate 358 and the operating stem 354 may occur and thereby lessen wear that would otherwise occur with a coupling having no freedom of movement, such as a threaded connection.

Referring now primarily to FIG. 9, a schematic perspective view of the gate 358 is shown with the proximal end 386 of the operating stem 354 formed with T-member 490 that has been slid partially out of a T-slot 494 formed on a first end 496 of the gate 358. The T-member 490 and the T-slot 494 are coordinated to securely fit but to allow movement in the 268 direction while providing secure coupling in the 272 direction. A second end 498 of the gate 358 is coupled to the balance stem 382.

The T-slot coupling 366 allows movement that results in less wear but also provides for more surface area between the members for a stronger connection than a threaded connection. While reference is made to "T" slot and "T" member, it should be understood that other shapes may be used, such as angled Xs or other shapes; the T slot and T member allow movement in one direction but not in the other. One will appreciate that this allows movement side to side without separation between the two components shown in FIG. 9.

This view also shows that gate 358 has a flow opening 502 that allows flow through flow bore 310 (FIG. 7) when the flow opening 502 is at least partially aligned with the flow bore 310.

The hydraulic valve 196 is used as a fracturing tree wing valve. It could, however, have other applications.

A studded valve, e.g., valve 196 cannot interface with another studded member, but needs to interface with a flanged member. In some embodiments, a wing valve flow assembly is used that includes a manual valve (e.g., manual valve 192 in FIG. 2) with a studded hydraulic valve (e.g., studded hydraulic valve 196 in FIGS. 2-7). In some embodiments, the manual valve is positioned closer to the crossflow member than the hydraulic valve. In some embodiments, a flanged hydraulic valve could be positioned closer to the crossflow member than the studded hydraulic valve. In some embodiments, a hydraulic valve could be closer to the flow cross member than the manual valve.

There are many embodiments of the disclosure herein that are possible. A number of additional examples follow.

Example 1. According to an illustrative embodiment, a hydraulic fracturing tree assembly 124 includes a flow cross member 144 and a wing 212, or first wing, extending from the flow cross member 144. The first wing 212 includes a manual valve 192 having a first flange 242 on a first side coupled to the flow cross member 144 and a second flange 224 on a second side. The manual valve 192 has a bore for flow therethrough in a first direction 268. The hydraulic fracturing tree assembly 124 further includes a studded hydraulic valve 196 having a first plurality of studs 216 extending from a first side 276 and parallel to the first direction 268, which is in a direction of flow through the studded hydraulic valve 196. The studded hydraulic valve 196 has a flow bore 310 therethrough. The studded hydraulic valve 196 is coupled to the manual valve 192 with the first plurality of studs 216 of the studded hydraulic valve 196 extending through the second flange 224 of the manual valve 192.

The studded hydraulic valve 196 may be a gate valve and may include a valve body 260 formed to resemble a cuboid having the first side 276 and an opposing second side 280, a third side 284 and an opposing fourth side 288, and a fifth side 292 and an opposing sixth side, which is the bottom surface of FIG. 4 and is analogous to the fifth side 292. A cuboid is a solid that has six rectangular faces at right angles to each other and here is being used in that way while recognizes that the faces need not be exactly 90 degrees but could be as much 5 degrees off.

The valve body 260 has the flow bore 310 extending from the first side 276 to the second side 280 and a valve gate bore 306 extending from the third side 284 to the fourth side 288. A gate 358 disposed within the valve gate bore 306, the gate 358 having a first end 496 and a second end 498. A piston unit 350 is coupled to the valve body 260 on the third side 284 and includes a piston 422 coupled to an operating stem 354 for selectively moving the operating stem 354. The operating stem 354 extends into the valve gate bore 306 and has a first end (upper end for orientation of FIG. 7) and a second end (lower end for the orientation in FIG. 7) and wherein the first end of the operating stem 354 is coupled to the piston 422 and wherein the second end of the operating stem has the T-member 490 formed thereon.

The gate 358 has a T-slot 494 formed on the first end 496 that is sized and configured to mate with the T-member 490 on the second end of the operating stem 354, and wherein the T-slot 494 is parallel with the first direction 268. Of course, the T-slot could be formed on the end of the operating stem 354 and the T-member on the gate in other embodiments.

Example 2. The hydraulic fracturing tree of Example 1, wherein the fourth side 288 of the valve body is formed with a bonnet seal ridge 326 concentric to the valve gate bore 306, and wherein the bonnet seal ridge 326 has a radial width 442 greater than 0.45 inches.

Example 3. The hydraulic fracturing tree of Example 1, wherein the bore of the manual valve has a diameter of 4 1/16 inches and is configured for a working pressure up to 15,000 PSI; and wherein the flow bore of the studded hydraulic valve has a diameter of 4 1/16 inches and is configured for a working pressure up to 15,000 PSI.

Example 4. The hydraulic fracturing tree 124 of Example 1, wherein the fourth side of the valve body is formed with a bonnet seal ridge 326 concentric to the valve gate bore 306; wherein the bonnet seal ridge 326 has a radial width greater than 0.45 inches; wherein the bore of the manual valve 192 has a diameter of 4 1/16 inches and is configured for a working pressure up to 15,000 PSI; and wherein the flow bore 310 of the studded hydraulic valve 196 has a diameter of 4 1/16 inches and is configured for a working pressure up to 15,000 PSI.

Example 5. The hydraulic fracturing tree 124 of Example 1, wherein the studded hydraulic valve 196 has a second plurality of studs 220 extending from a second side 280 and parallel to the first direction 268, and further comprising a WECO flange 200 coupled to the second plurality of studs 220 of the studded hydraulic valve 296.

Example 6. The hydraulic fracturing tree 124 of Example 1, wherein the valve body 260 is formed with a raised portion 318 formed as ring concentric about the valve gate bore 306 and having a radial dimension greater than 0.45 inches.

Example 7. The hydraulic fracturing tree 124 of Example 1, further including a bonnet seal ridge 326 formed on the fourth side of the valve body 260 and concentric to and about the gave valve bore 306; and a raised portion 318 formed on the fourth side of the valve body 260 and formed outboard of the bonnet seal ridge 326 with a trough 322 formed between the bonnet seal ridge 326 and the raised portion 318.

Example 8. According to an illustrative embodiment, a method of manufacturing a hydraulic fracturing wing valve 196 includes forming a valve body 260 to resemble a cuboid having a first side 276 and an opposing second side 280, a third side 284 and an opposing fourth side 288, a fifth side 292 and an opposing sixth side. The method further includes forming a flow bore 310 through the valve body 260 in a first direction 268 from the first side 276 to the second side 280 (understand to include vice-versa); and forming a gate valve bore 306 through the valve body 260 from the third side 284 to the fourth side 288 (understand to include vice versa). The method also includes drilling and taping a first plurality of stud bores 370 on the first side 276 of the valve body 260; applying a first plurality of studs 216 into the first plurality of stud bores 370 such that the first plurality of studs 316 extends from the first side 276 of the valve body 260; drilling and taping a second plurality of stud bores 374 on the second side 280 of the valve body 260; and applying a second plurality of studs 220 into the second plurality of stud bores 374 such that the second plurality of studs 220 extend from the second side 280 of the valve body 260. The method also includes providing a gate 358 having a first end 496 and a second end 498 with a T-slot 494 formed on the first end 496 of the gate 358; providing an operating stem 354 having a first end and a second end. The second end of the operating stem 354 is formed with a T-member 490; coupling a piston unit 350 to the third side 284 of the valve body 2560, wherein the piston unit has a piston 422; coupling the piston 422 to the first end of the operating stem 354; and coupling the operating stem 354 to the gate 358 by disposing the T-member 490 into the T-slot 494 for a slideable engagement that allows movement in the first direction 268.

Example 9. The method of manufacturing a hydraulic fracturing wing valve of Example 8, further comprising:

forming a bonnet seal ridge on the fourth side of the valve body and concentric to and about the gate valve bore; and forming a raised portion on the fourth side of the valve body and formed outboard of the bonnet seal ridge with a trough formed between the bonnet seal ridge and the raised portion.

Example 10. The method of manufacturing a hydraulic fracturing wing valve of Example 9, wherein the bonnet seal ridge has a radial dimension greater than 0.5 inches.

Example 11. According to an illustrative embodiment, a method of regulating flow in a wing of a hydraulic fracturing tree, the method comprising:

coupling a manual valve proximate a flow cross member of a fracturing tree, the manual valve having a first flange on a first side and a second flange on a second side, the first flange coupled to the flow cross member;

coupling a studded hydraulic valve to the second flange of the manual valve, wherein a first plurality of studs extends from a first side of the studded hydraulic valve and extend through the second flange of the manual valve; and wherein the studded hydraulic valve is a gate valve and has a T-slot coupling between an operating stem and a first end of the gate.

Example 12. The method of Example 11, wherein the T-slot coupling comprises a T-member formed on an end of the operating stem and a T-slot formed on the first end of the gate.

Example 13. The method of Example 11, wherein the manual valve comprises a flow bore with a diameter less than five inches and is sized for an operating pressure up to 15,000 PSI, and the studded hydraulic valve has a flow bore with a diameter less than five inches and is sized for an operating pressure up to 15,000 PSI.

Example 14. The method of Example 11, wherein the studded hydraulic valve has a second plurality of studs extending from a second side, and further comprising coupling a WECO flange to the second plurality of studs of the studded hydraulic valve.

Example 15 The method of Example 11, wherein the studded hydraulic valve 196 comprises a valve body 260, wherein a valve gate bore 306 extends through the valve body 260, and a bonnet seal ridge 326 is formed on a side 288 of the valve body 260 concentric to and about a gate valve bore 310, and wherein the bonnet seal ridge 326 is greater than 0.45 inches.

Example 16. The method of Example 15, wherein the side of the valve body 260 further includes a raised portion 318 formed outboard of the bonnet seal ridge 326 with a trough 322 formed between the bonnet seal ridge 326 and the raised portion 318. Other examples are possible.

As used herein, the term "coupled" includes coupling via a separate object and includes direct coupling. The term "coupled" also encompasses two or more components that are continuous with one another by virtue of each of the components being formed from the same piece of material. Also, the term "coupled" may include in some contexts chemical, such as via a chemical bond, mechanical, thermal, or electrical coupling. Fluid coupling means that fluid may be in communication between the designated parts or locations.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in a connection to any one embodiment may also be applicable to any other embodiment.

What is claimed:

1. A hydraulic fracturing tree assembly comprising a flow cross member and a first wing extending from the flow cross member, wherein the first wing comprises:
   a manual valve having a first flange on a first side coupled to the flow cross member and a second flange on a second side;
   wherein the manual valve has a bore for flow therethrough in a first direction;
   a studded hydraulic valve having a first plurality of studs extending from a first side of the studded hydraulic valve and parallel to the first direction, which is in a direction of flow through the studded hydraulic valve;
   wherein the studded hydraulic valve has a flow bore therethrough;
   wherein the studded hydraulic valve is coupled to the manual valve with the first plurality of studs of the studded hydraulic valve extending through the second flange of the manual valve;
   wherein the studded hydraulic valve is a gate valve; and
   wherein the studded hydraulic valve comprises:
   a cuboid valve body having a first side and an opposing second side, a third side and an opposing fourth side, and a fifth side and an opposing sixth side, wherein the first plurality of studs extending from the first side of the studded hydraulic valve extend from the first side of the valve body;
   wherein the valve body has the flow bore extending from the first side to the second side and a valve gate bore extending from the third side to the fourth side,
   a gate disposed within the valve gate bore, the gate having a first end and a second end,
   a piston unit coupled to the valve body on the third side and having a piston coupled to an operating stem for selectively moving the operating stem, the operating stem extending into the valve gate bore and having a first end and a second end, wherein the first end of the operating stem is coupled to the piston and wherein the second end of the operating stem has the T-member formed thereon, and
   wherein the gate has a T-slot formed on the first end that is sized and configured to mate with the T-member on the second end of the operating stem, and wherein the T-slot is parallel with the first direction.

2. The hydraulic fracturing tree of claim 1, wherein the fourth side of the valve body is formed with a bonnet seal ridge concentric to the valve gate bore, and wherein the bonnet seal ridge has a radial width greater than 0.45 inches.

3. The hydraulic fracturing tree of claim 1, wherein the bore of the manual valve has a diameter of 4 1/16 inches and is configured for a working pressure up to 15,000 PSI; and wherein the flow bore of the studded hydraulic valve has a diameter of 4 1/16 inches and is configured for a working pressure up to 15,000 PSI.

4. The hydraulic fracturing tree of claim 1, wherein the fourth side of the valve body is formed with a bonnet seal ridge concentric to the valve gate bore; wherein the bonnet seal ridge has a radial width greater than 0.45 inches; wherein the bore of the manual valve has a diameter of 4 1/16 inches and is configured for a working pressure up to 15,000 PSI;
   and wherein the flow bore of the studded hydraulic valve has a diameter of 4 1/16 inches and is configured for a working pressure up to 15,000 PSI.

5. The hydraulic fracturing tree of claim 1, wherein the studded hydraulic valve has a second plurality of studs extending from a second side and parallel to the first direction, and further comprising a WECO flange coupled to the second plurality of studs of the studded hydraulic valve.

6. The hydraulic fracturing tree of claim 1, wherein the valve body is formed with a raised portion formed as ring concentric about the valve gate bore and having a radial dimension greater than 0.5 inches.

7. The hydraulic fracturing tree of claim 1, further comprising:
   a bonnet seal ridge formed on the fourth side of the valve body and concentric to and about the gave valve bore; and
   a raised portion formed on the fourth side of the valve body and formed outboard of the bonnet seal ridge with a trough formed between the bonnet seal ridge and the raised portion.

8. A hydraulic fracturing wing valve comprising:
   a cuboid valve body having a first side and an opposing second side, a third side and an opposing fourth side, a fifth side and an opposing sixth side;
   wherein the valve body is formed with a flow bore extending through the valve body in a first direction from the first side to the second side;
   wherein the valve body is formed with a gate valve bore extending from the third side to the fourth side;
   a first plurality of studs extending from the first side of the valve body;
   a second plurality of studs extending from the second side of the valve body;
   a gate having a first end and a second end;
   a T-slot formed on the first end of the gate;
   an operating stem having a first end and a second end, wherein the second end of the operating stem is formed with a T-member;
   a piston unit coupled to the third side of the valve body, wherein the piston unit has a piston that couples to the first end of the operating stem;
   wherein the T-slot is sized and configured to slidably couple to the T-member of the operating stem, and wherein the T-slot is parallel to the first direction; and
   a plurality of bonnet studs extending from the fourth side of the valve body.

9. The hydraulic fracturing wing valve of claim 8, further comprising:
   a bonnet seal ridge formed on the fourth side of the valve body and concentric to and about the gate valve bore; and
   a raised portion formed on the fourth side of the valve body and formed outboard of the bonnet seal ridge with a trough formed between the bonnet seal ridge and the raised portion.

10. The hydraulic fracturing wing valve of claim 9, wherein the bonnet seal ridge has a radial dimension greater than 0.5 inches.

11. The hydraulic fracturing wing valve of claim 8, wherein the flow bore of the studded hydraulic valve has a diameter of 4 1/16 inches and is configured for a working pressure up to 15,000 PSI.

12. A method of manufacturing a hydraulic fracturing wing valve comprising:
   forming a cuboid valve body having a first side and an opposing second side, a third side and an opposing fourth side, a fifth side and an opposing sixth side;
   forming a flow bore through the valve body in a first direction from the first side to the second side;
   forming a gate valve bore through the valve body from the third side to the fourth side;

drilling and tapping a first plurality of stud bores on the first side of the valve body;

applying a first plurality of studs into the first plurality of stud bores such that the first plurality of studs extends from the first side of the valve body;

drilling and tapping a second plurality of stud bores on the second side of the valve body;

applying a second plurality of studs into the second plurality of stud bores such that the second plurality of studs extend from the second side of the valve body;

providing a gate having a first end and a second end with a T-slot formed on the first end of the gate;

providing an operating stem having a first end and a second end, wherein the second end of the operating stem is formed with a T-member;

coupling a piston unit to the third side of the valve body, wherein the piston unit has a piston;

coupling the piston to the first end of the operating stem; and coupling the operating stem to the gate by disposing the T-member into the T-slot for a slideable engagement that allows movement in the first direction.

13. The method of manufacturing a hydraulic fracturing wing valve of claim 12, further comprising:

forming a bonnet seal ridge on the fourth side of the valve body and concentric to and about the gate valve bore; and forming a raised portion on the fourth side of the valve body and formed outboard of the bonnet seal ridge with a trough formed between the bonnet seal ridge and the raised portion.

14. The method of manufacturing a hydraulic fracturing wing valve of claim 13, wherein the bonnet seal ridge has a radial dimension greater than 0.45 inches.

15. A hydraulic fracturing tree assembly comprising a flow cross member and a first wing extending from the flow cross member, wherein the first wing comprises:

a manual valve having a first flange on a first side coupled to the flow cross member and a second flange on a second side;

wherein the manual valve has a bore for flow therethrough in a first direction;

a studded hydraulic valve having a first plurality of studs extending from a first side and parallel to the first direction, which is in a direction of flow through the studded hydraulic valve;

wherein the studded hydraulic valve has a flow bore therethrough;

wherein the studded hydraulic valve is coupled to the manual valve with the first plurality of studs of the studded hydraulic valve extending through the second flange of the manual valve;

wherein the studded hydraulic valve is a gate valve; and wherein the studded hydraulic valve comprises:

a cuboid valve body having a first side and an opposing second side, a third side and an opposing fourth side, and a fifth side and an opposing sixth side;

wherein the valve body has the flow bore extending from the first side to the second side and a valve gate bore extending from the third side to the fourth side, a gate disposed within the valve gate bore, the gate having a first end and a second end, a piston unit coupled to the valve body on the third side and having a piston coupled to an operating stem for selectively moving the operating stem, the operating stem extending into the valve gate bore and having a first end and a second end, wherein the first end of the operating stem is coupled to the piston and wherein the second end of the operating stem has the T-member formed thereon, wherein the gate has a T-slot formed on the first end that is sized and configured to mate with the T-member on the second end of the operating stem, and wherein the T-slot is parallel with the first direction; and wherein the fourth side of the valve body is formed with a bonnet seal ridge concentric to the valve gate bore, and wherein the bonnet seal ridge has a radial width greater than 0.45 inches.

* * * * *